(12) United States Patent
Hiratsuka et al.

(10) Patent No.: US 7,461,219 B2
(45) Date of Patent: Dec. 2, 2008

(54) DISK DRIVE AND METHOD FOR PERFORMING REALTIME PROCESSING AND NON-REALTIME PROCESSING SIMULTANEOUSLY

(75) Inventors: Yukie Hiratsuka, Kanagawa (JP); Yukihide Inagaki, Kanagawa (JP); Tetsuya Uemura, Saitama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 771 days.

(21) Appl. No.: 11/112,365

(22) Filed: Apr. 22, 2005

(65) Prior Publication Data
US 2005/0248871 A1 Nov. 10, 2005

(30) Foreign Application Priority Data
Apr. 23, 2004 (JP) ............................. 2004-128592

(51) Int. Cl.
*G06F 12/00* (2006.01)
(52) U.S. Cl. .......................... 711/158; 360/69
(58) Field of Classification Search ................. 711/158
See application file for complete search history.

(56) References Cited

U.S. PATENT DOCUMENTS 5,787,482 A * 7/1998 Chen et al. ................. 711/158
6,553,476 B1 * 4/2003 Ayaki et al. ................. 711/204
2006/0253675 A1 * 11/2006 Johannes Bloks ........... 711/167

FOREIGN PATENT DOCUMENTS

JP 10-222310 8/1998

\* cited by examiner

*Primary Examiner*—Kevin Ellis
*Assistant Examiner*—Hashem Farrokh
(74) *Attorney, Agent, or Firm*—Townsend and Townsend and Crew LLP; Rambod Nader (57) ABSTRACT

Embodiments of the invention ensure both a realtime nature of a realtime processing and data integrity of a non-realtime processing and perform the both processings efficiently when the realtime processing and the non-realtime processing are performed simultaneously. In one embodiment, a time limit is set not only for a realtime processing command but also for a non-realtime processing command and, if the execution of the non-realtime processing command is not completed within the set time limit, the execution of the non-realtime processing command is interrupted forcibly and a host is informed of a data transfer status at the time of the interruption so that the host can restart the interrupted processing based on the data transfer status of the interrupted processing when a time that can be allocated for the non-realtime processing command occurs again.

15 Claims, 10 Drawing Sheets

| Register | 7 | 6 | 5 | 4 | 3 | 2 | 1 | 0 |
|---|---|---|---|---|---|---|---|---|
| Features | \multicolumn{8}{c|}{Command Completion Time Limit} |
| Sector Count | Sector Count ||||||||
| Sector Number | LBA[7:0] ||||||||
| Cylinder Low | LBA[15:8] ||||||||
| Cylinder High | LBA[23:16] ||||||||
| Device/Head | obs | LBA | obs | DEV | LBA[27:24] ||||
| Command | C8h ||||||||

Fig.4

| Register | 7 | 6 | 5 | 4 | 3 | 2 | 1 | 0 |
|---|---|---|---|---|---|---|---|---|
| Error | ICRC | UNC | MC | IDNF | MCR | ABRT | NM | obs |
| Sector Count | na ||||||||
| Sector Number | LBA[7:0] ||||||||
| Cylinder Low | LBA[15:8] ||||||||
| Cylinder High | LBA[23:16] ||||||||
| Device/Head | obs | LBA | obs | DEV | LBA[27:24] ||||
| Status | BSY | DRDY | DF | na | DRQ | na | na | ERR |

| Stream ID | Latest command publication time (ms) | Command publication interval (ms) | Next command publication estimated time (ms) |
|---|---|---|---|
| Stream A | 1212.0 | 300 | 1512.0 |
| Stream B | 1312.0 | 300 | 1612.0 |
| Stream C | 1412.0 | 300 | 1712.0 |

| Time \ Stream ID | | Stream A | Stream B | Stream C |
|---|---|---|---|---|
| Latest command publication time (ms) | | 1212.0 | 1312.0 | 1412.0 |
| Command publication intervals for latest 10 commands (ms) | 1 | 300 | 299 | 297 |
| | 2 | 290 | 295 | 300 |
| | 3 | 295 | 297 | 299 |
| | : | : | : | : |
| | : | : | : | : |
| | 10 | 299 | 300 | 301 |
| Average command publication interval (ms) | | 300 | 298 | 299 |

Fig.11

DISK DRIVE AND METHOD FOR PERFORMING REALTIME PROCESSING AND NON-REALTIME PROCESSING SIMULTANEOUSLY

CROSS-REFERENCES TO RELATED APPLICATIONS

This application claims priority from Japanese Patent Application No. JP2004-128592, filed Apr. 23, 2004, the entire disclosure of which is incorporated herein by reference.

BACKGROUND OF THE INVENTION

The present invention relates to a disk drive and its interfacing technique that ensures a realtime nature of a realtime processing and data integrity of a non-realtime processing and, further, allows both processings to be performed efficiently when the realtime and non-realtime processings are performed simultaneously.

In a realtime processing such as an AV data processing, in order to ensure a realtime nature, a disk drive must observe a predetermined time limit accurately to perform data transfer.

To this end, in ATA/ATAPI-7 (that is in the course of standardization according to ANSI standards), it is contemplated to introduce a command set that can set a command completion time limit for each stream or each command so as to ensure the realtime nature in the AV data processing that is performed in realtime.

Further, when the realtime and non-realtime processings are performed simultaneously, a control is performed so that the realtime processing command is executed with priority and, if it is expected that there is a sufficient time to be allocated for the non-realtime processing command, the non-realtime processing command is executed within such allocatable time. Such method for controlling command execution is disclosed in Japanese Patent Laid-open No. Hei 10-222310.

BRIEF SUMMARY OF THE INVENTION

In spite of the fact that the AV data processing command in ATA/ATAPI-7 provides a mechanism for terminating the command processing that has been started once if the process cannot be completed within a predetermined time limit so as to ensure the realtime nature of the AV data processing, when the AV data processing that is performed in realtime and the non-realtime processing such as word processing applications are performed simultaneously, there is a problem in that the time limit cannot be set for the non-realtime processing that is performed between two AV data processings and, therefore, the realtime nature of the AV data processing cannot be ensured.

Further, in Patent Laid-open No. Hei 10-222310, in order to strictly observe the time limit of the realtime processing, the execution time of the non-realtime processing commands is estimated in advance so that only the non-realtime processing commands that are expected to be completed within a time range that does not impair the realtime nature of the realtime processing are allowed to be executed but, there is a problem in that the non-realtime processing commands that cannot be completed within the expected time period are difficult to be executed.

It is a feature of the present invention to ensure both a realtime nature of a realtime processing and data integrity of a non-realtime processing, and perform both processings efficiently when the realtime processing that attaches primary importance to the realtime nature and the non-realtime processing that attaches primary importance to the data integrity are performed simultaneously.

In one aspect, a disk drive of the present invention sets a time limit also in a non-realtime processing so that a command can be executed only within a certain time period. However, in the non-realtime processing that attaches primary importance to data integrity, if the execution of the non-realtime processing command is not completed within the set time period, the disk drive interrupts the processing forcibly and notifies a host of a data transfer status at the time of the interruption so that the host can restart the interrupted processing based on the data transfer status of the interrupted processing when a time that can be allocated for the non-realtime processing command occurs again.

Thus, according to an aspect of the present invention, there is provided a disk drive comprising: a disk; a timer for managing times in the disk drive; a CPU; a ROM; a RAM; a cache for temporarily storing data read from the disk; and a hard disk controller for controlling data transfer via the cache. A time limit is set not only for a realtime processing command but also for a non-realtime processing command. If the execution of the non-realtime processing command is not completed within the set time limit, the processing is interrupted forcibly and a host is informed of a data transfer status at the time of the interruption so that the host can restart the interrupted processing based on the data transfer status of the interrupted processing when a time that can be allocated for the non-realtime processing command occurs again. Further, when the non-realtime processing is interrupted, even after the host is informed of a result of the interruption of the non-realtime processing, the non-realtime processing, which is interrupted to transfer data to the host, can continue data transfer to the cache till the host publishes the next command and a cache miss of such command is found.

Still further, when the time limit is set for the non-realtime processing, the disk drive described above can set the time that the host determines to be allocatable for the non-realtime processing via each command for the non-realtime processing.

Still further, the disk drive described above can set a time that can be allocated for the non-realtime processing command by obtaining a command publication interval required for satisfying data transfer requests by the host for each stream of the realtime processing in advance from the host via a host interface, estimating the next command publication times for each stream based on the command publication interval, and calculating a difference between the earliest command publication time among the estimated command publication times for each stream and the time when the non-realtime processing command is received.

Still further, the disk drive described above can set a time that can be allocated for the non-realtime processing command, during the realtime processing, by estimating a command publication interval for each stream by keeping a history of the command publication interval required for satisfying data transfer requests by the host for each stream, estimating the next command publication times for each stream based on the estimated command publication interval, and calculating a difference between the earliest command publication time among the estimated command publication times for each stream and the time when the non-realtime processing command is received. Still further, when a realtime processing command is received during an after write operation and there is a cache miss for such command, the disk drive described above can execute the AV data processing command with priority by interrupting an after write operation.

According to the present invention, both a realtime nature of a realtime processing and data integrity of a non-realtime processing can be ensured and the both processings can be performed efficiently when the realtime processing that attaches primary importance to the realtime nature and the non-realtime processing that attaches primary importance to the data integrity are performed simultaneously.

DETAILED DESCRIPTION OF THE INVENTION

Hereinafter, embodiments of the present invention will be described with reference to the drawings. In this connection, realtime processing is represented by AV data processing and non-realtime processing is represented by PC data processing in the embodiments described below. However, it is to be noted that such representation does not intend to limit the realtime and non-realtime processing to the AV data and PC data processing, respectively.

Figure 1:
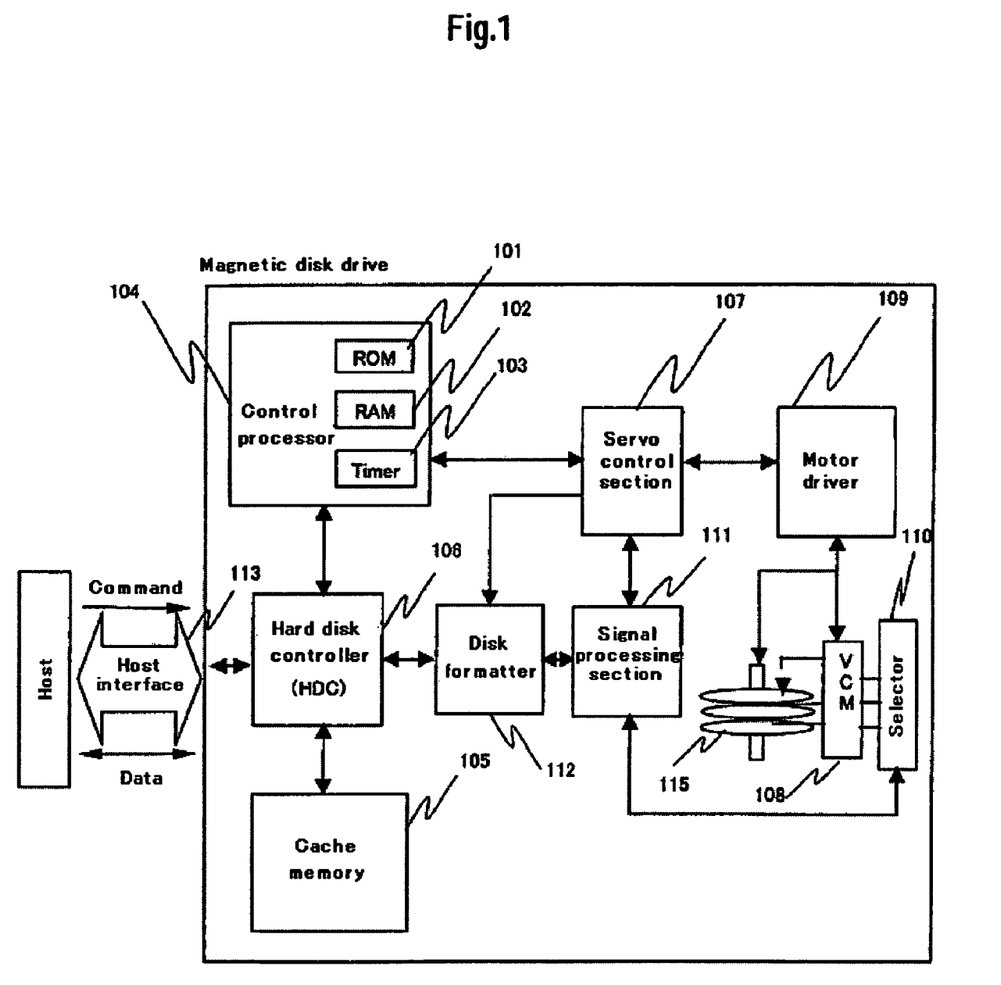
FIG. 1 is an exemplary configuration of a disk drive according to an embodiment of the present invention.

FIG. 1 shows an exemplary configuration of a disk drive to which the present invention is applied. The disk drive according to the present embodiment comprises: a programmable ROM 101 for implementing a control program; a RAM 102 for storing data within a cache and a table for managing data primarily regarding a cache area; a timer 103 for managing and setting times in the disk drive; a control processor 104 that includes the ROM 101, the RAM 102 and the timer 103 for reading and executing the control program on the ROM; a cache 105 where read request data/write request data is written temporarily; a hard disk controller (hereinafter abbreviated as HDC) 106 for controlling data transfer between the host and the cache 105 as well as between the cache 105 and the disk; a servo control section 107 for controlling to move a head to specified positions when the data is read or written; a voice coil motor (VCM) 108 for moving the head according to the instructions of the servo control section; a motor driver 109 for controlling rotation of a disk 115; a selector 110 for selecting only signals of a specified head from magnetic signals read through heads; a signal processing section 111 for converting analog data sent from the selector 110 into digital data or converting digital data sent from the HDC 106 into analog data; a disk formatter 112 for transferring read data sent from the signal processing section 111 to the cache 105 by opening/closing a read gate or transferring write data sent from the cache 105 to the signal processing section 111 by opening/closing a write gate; and an interface controlling section 113 for exchanging commands and data with a host.

Figure 2A:
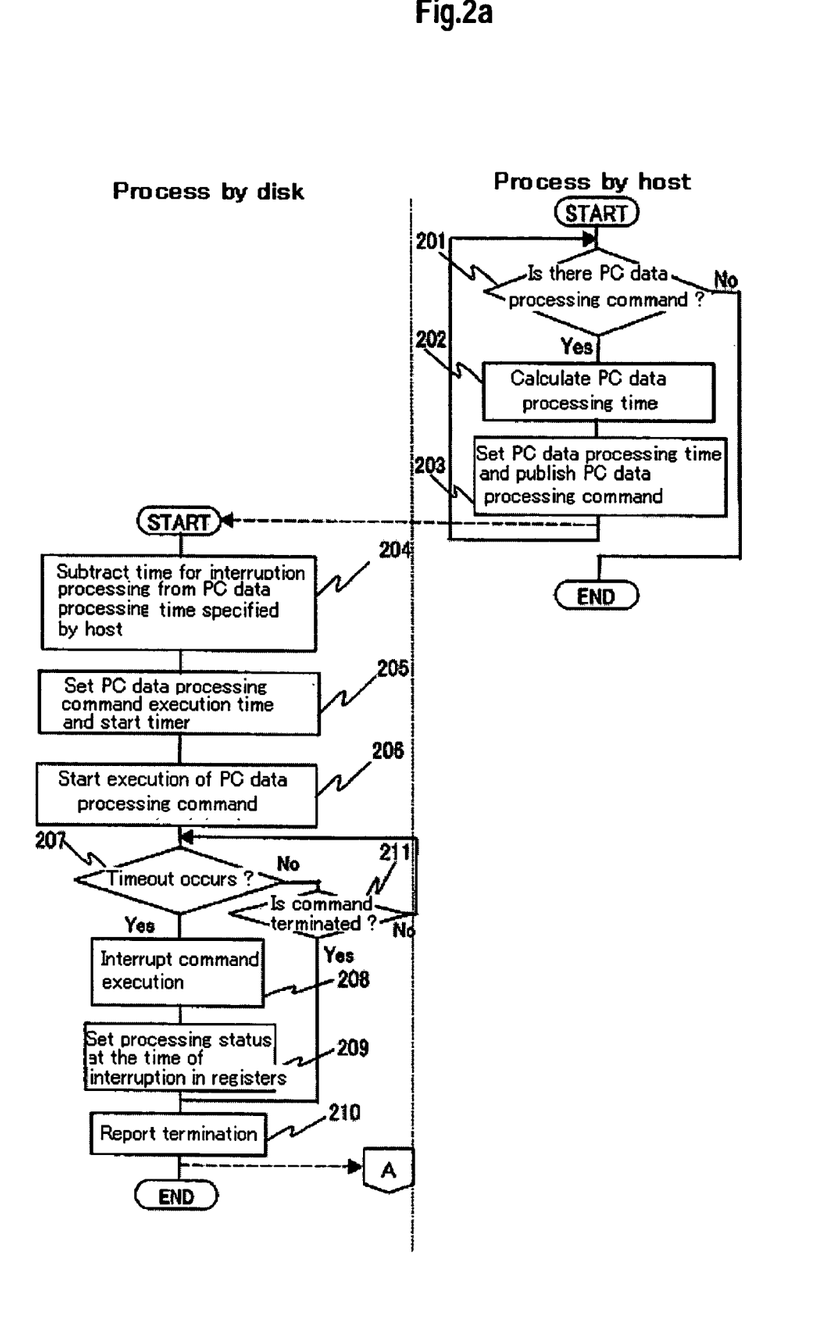
FIGS. 2a and 2b show a diagram showing a control flow for setting a time that the host can allocate for PC data processing according to an embodiment of the present invention.
Figure 2B:
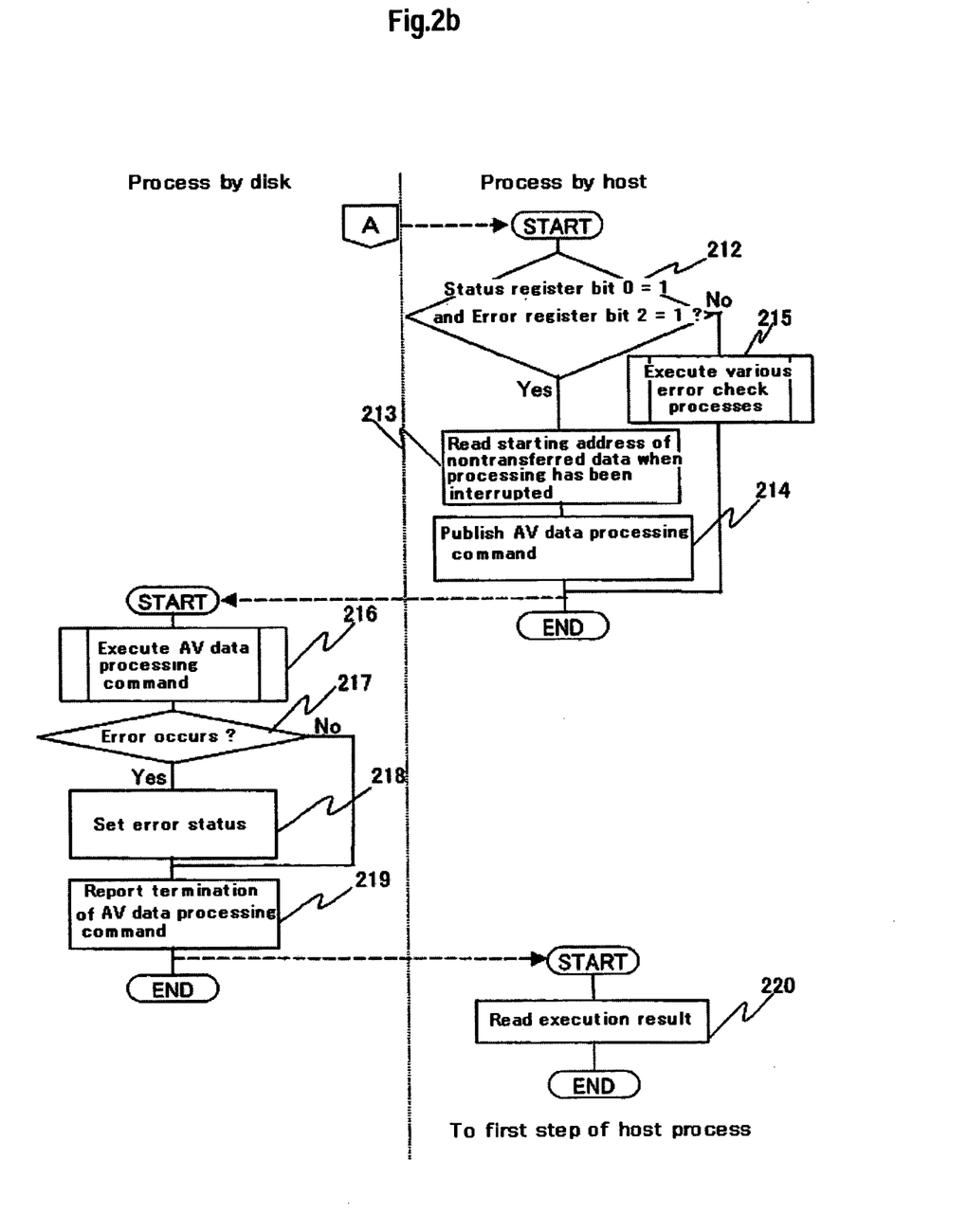

FIGS. 2a and 2b show a control flow for setting a time that the host can allocate for PC data processing.

The host checks whether any PC data processing command is scheduled to be published (step 201). If there is a PC data processing command to be published, the host calculates a time that can be allocated for such PC data processing command (step 202). After calculating the time that can be allocated for such command, the host sets such time in a command register of the HDC 106 and publishes the PC data processing command (step 203).

Figure 3:
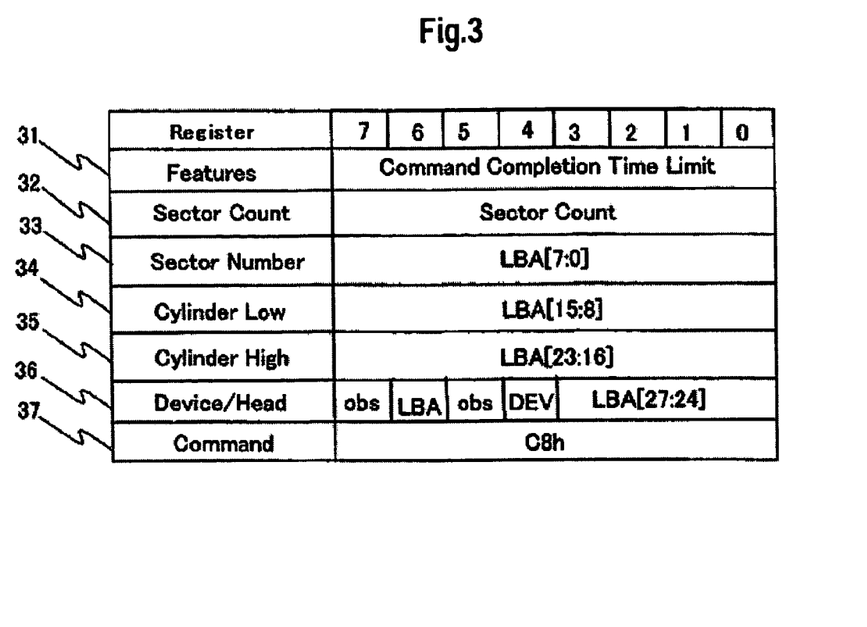
FIG. 3 is a diagram showing an example of a PC data processing command in which a command completion time limit can be set.

FIG. 3 shows an example of a PC data processing command in which a command completion time limit can be set. The PC data processing command includes Features register 31, Sector Count register 32, Sector Number register 33, Cylinder Low register 34, Cylinder High register 35, Device/Head register 36 and Command register 37. Though no value is set in the Features register 31 in ATA/ATAPI-5 specifications, in the interface of the disk drive according to the present embodiment, the host sets a time that can be allocated for the command in the Features register 31. Then, a sector count of the data to be transferred is set in the Sector Count register 32. Then, 0 to 7 bits of an LBA address are set in the Sector Number register 33. Then, 8 to 15 bits of the LBA address are set in the Cylinder Low register 34. Then, 16 to 23 bits of the LBA address are set in the Cylinder High register 35. Then, 24 to 27 bits of the LBA address are set in bits 0 to 3 of the Device/Head register 36. Then, a number of the selected device (a master device is numbered as 0 and a slave device is numbered as 1) is set in bit 4 of the Device/Head register 36. Then, 1 is set in bit 6 of the Device/Head register 36 to indicate the LBA address. Then, 0 is set in bits 5 and 7 of the Device/Head register 36 because these bits are disused. Then, a code of the command is set in the Command register 37.

Returning to FIG. 2a, after the command is published, the disk drive of the present embodiment calculates a time that can actually be allocated for the PC data processing command by subtracting a time to be taken for interruption processing of the command from the time set in the Features register 31 of the PC data processing command (step 204). Next, the time for executing the PC data processing command is set and the timer 103 is started (step 205). The execution of the PC data processing command is started (step 206). It is checked whether a timeout has occurred (step 207) and, if the timeout has occurred, the execution of the command is interrupted (step 208). The processing status at the time of the interruption is set in the registers of the HDC 106 (step 209). After that, the HDC 106 reports to the host that the command is terminated (step 210).

On the other hand, when it is checked whether the timeout has occurred (207), if the timeout has not occurred, it is checked whether the command is terminated (step 211). If the command is not terminated, the timeout is checked again (step 207). On the other hand, if the command is terminated, the HDC 106 reports to the host that the command is terminated (step 210).

Figure 4:
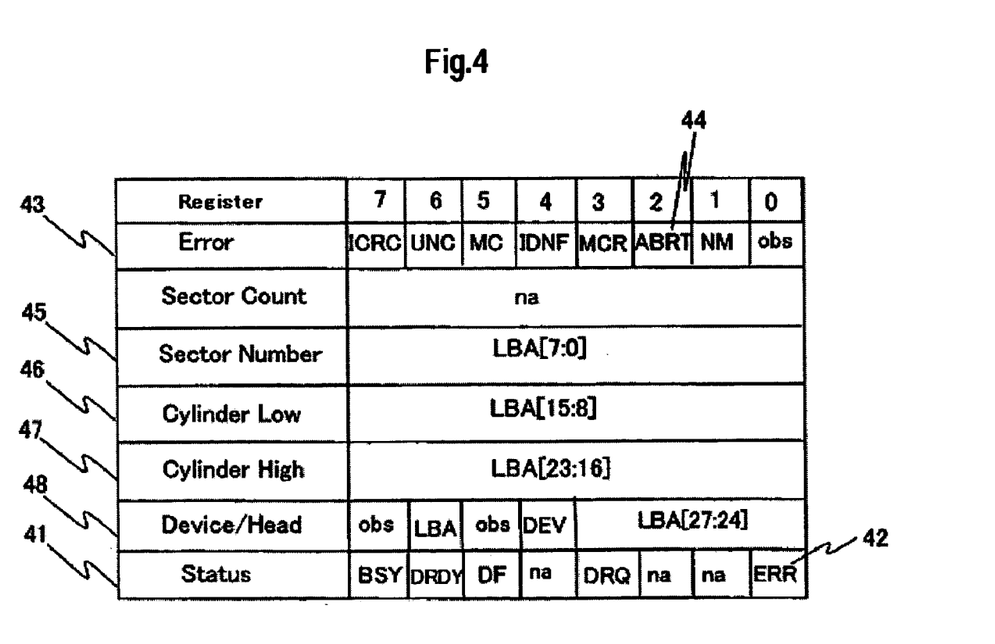
FIG. 4 is a diagram showing a configuration of registers in which a result of execution of the PC data processing command is set according to an embodiment of the present invention.

FIG. 4 shows a configuration of registers in which a result of execution of the PC data processing command is set. Hereinafter, the data to be set in the registers for setting the execution result when the execution of the command is interrupted forcibly upon expiration of the time set in the PC data processing command will be described in detail. When the interruption processing occurs, 1 is set in bit 0 (42) of Status register 41. Then, 1 is set in bit 2 (44) of Error register 43 to indicate that the process is interrupted due to the expiration of the time. Then, each bit of the LBA indicating the starting address of the nontransferred data when the processing has been interrupted is set in each of Sector Number (45), Cylinder Low (46), Cylinder High (47) and Device/Head (48) registers.

Returning to FIG. 2b, when the host receives the report about the termination of the command from the disk drive, the host checks whether bit 0 (42) of the Status register 41 is 1 and bit 2 (44) of the Error register (43) is 1 in the execution result (step 212). If bit 0 (42) of the Status register 41 is 1 and bit 2 (44) of the Error register (43) is 1, the starting address of the nontransferred data when the processing has been interrupted is read (step 213). Next, the host publishes an AV data processing command (step 214). On the other hand, if the condition that bit 0 (42) of the Status register 41 is 1 and bit 2 (44) of the Error register (43) is 1 is not satisfied (step 212), the host executes various error check processes (step 215). When a time that can be allocated for the non-realtime processing command occurs again, the host publishes the next non-realtime processing command and sets the starting address for data transfer by using the starting address of the non-transferred data that has been read in step 213.

Then, receiving the AV data processing command from the host, the disk drive executes the AV data processing command (step 216). If any error occurs in the AV data processing (step 217), the error status is set in the registers for setting the execution result of the HDC 106 (step 218). Next, the disk drive reports that the AV data processing command is terminated (step 219). On the other hand, if no error occurs in the AV data processing (step 217), the disk drive reports that the command is terminated as usual (step 219).

Then, receiving the termination report from the disk drive, the host reads the registers indicating the execution result and checks the status when the process is terminated (step 220). After the AV data processing command is completed, the process returns to step 201.

Figure 5:
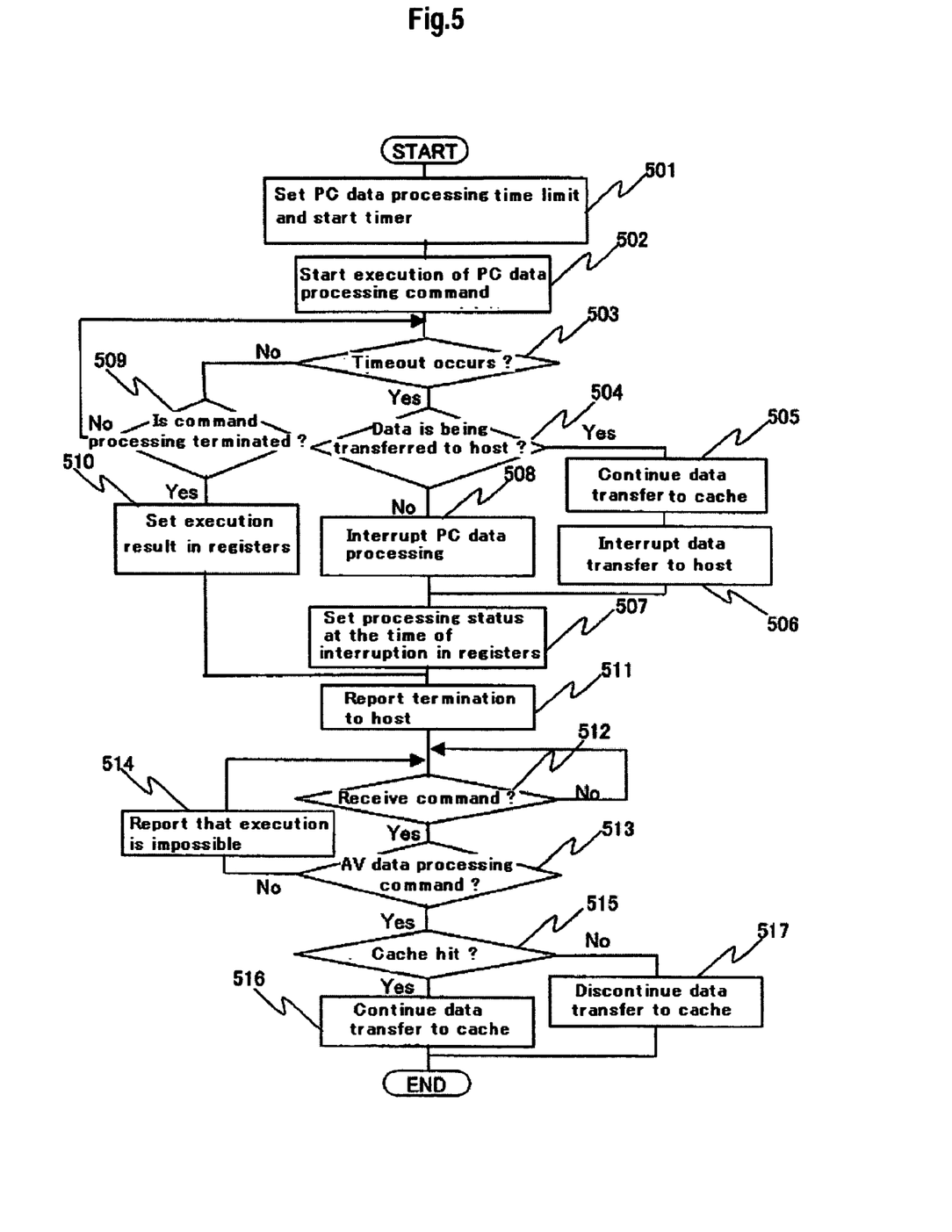
FIG. 5 is a diagram showing an example of a control flow after a data transfer to the host is interrupted due to timeout.

FIG. 5 shows a control flow for continuing the data transfer to the cache till any cache error occurs in the subsequent AV data processing even after the data transfer to the host is interrupted upon the interruption of the PC data read processing due to the timeout.

Starting the PC data processing, the disk drive of the present embodiment sets a time limit for the PC data processing and starts the timer (step 501). Next, the PC data processing command is started (step 502). It is checked whether there is a timeout (step 503) and, if the timeout is detected, it is checked whether the data is being transferred to the host (step 504) and, if the data is transferred to the host at the time of the timeout, the data transfer to the cache is continued (step 505) and the data transfer to the host is interrupted (step 506). On the other hand, when the timeout is detected and it is checked whether the data is being transferred to the host (step 504), if the data is not being transferred, the PC data processing is interrupted (step 508). Next, the processing status at the time of the interruption is set in the registers (step 507). The execution result is reported to the host (step 511).

On the other hand, when the PC data processing command is started (step 502) and it is checked whether there is a timeout (step 503), if the timeout is not detected, it is checked whether the command processing is terminated (step 509). If the command processing is not terminated, the timeout is checked again (step 503). When it is checked whether the command processing is terminated (step 509), if the command processing is terminated, the execution result is set in the registers (step 510). The execution result is reported to the host (step 511).

Next, it is checked whether the HDC 106 receives the next command (step 512). If the next command is received, it is checked whether the received command is the AV data processing command (step 513). If it is not the AV data processing command, the disk drive reports to the host that it cannot execute the received command (step 514) and checks whether the command is received again (step 512).

On the other hand, when it is checked whether the received command is the AV data processing command (step 513), if it is the AV data processing command, it is checked whether there is a cache hit for the data of the command (step 515). If there is a cache hit, the data transfer to the cache for the interrupted PC data processing command is continued (step 516). On the other hand, if there is no cache hit for the received AV data processing command, the data transfer to the cache for the interrupted PC data processing command is discontinued (step 517).

Figure 6:
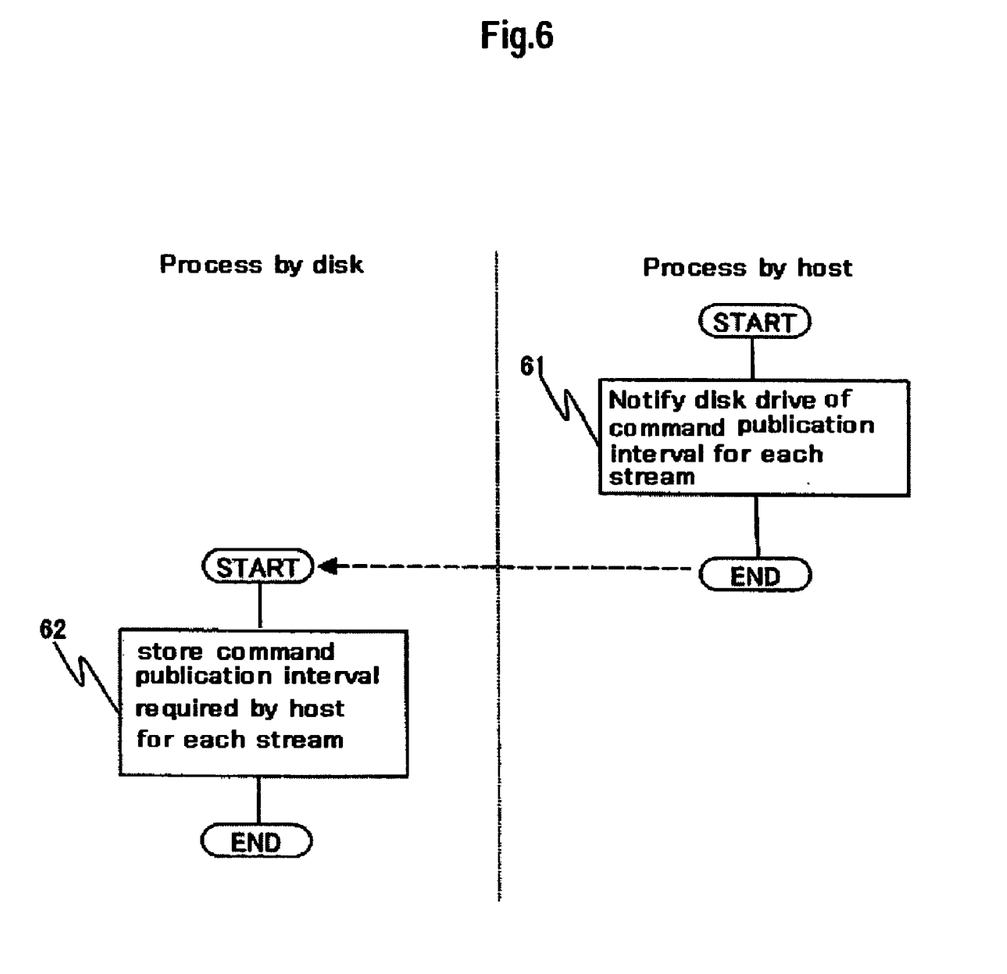
FIG. 6 is a diagram showing a process flow in which the host notifies the disk drive of a command publication interval according to an embodiment of the present invention.

FIG. 6 shows a process flow in which the host notifies the disk drive of a command publication interval for each stream. The host notifies the disk drive of a command publication interval that is required for maintaining a data transfer rate for each stream (step 61). The command publication interval is notified, for example, by using Set Features command in ATA/ATAPI-5. Receiving the command publication interval for each stream from the host, the disk drive of the present embodiment stores the command publication interval for each stream in the RAM 102 (step 62).

Figure 7:
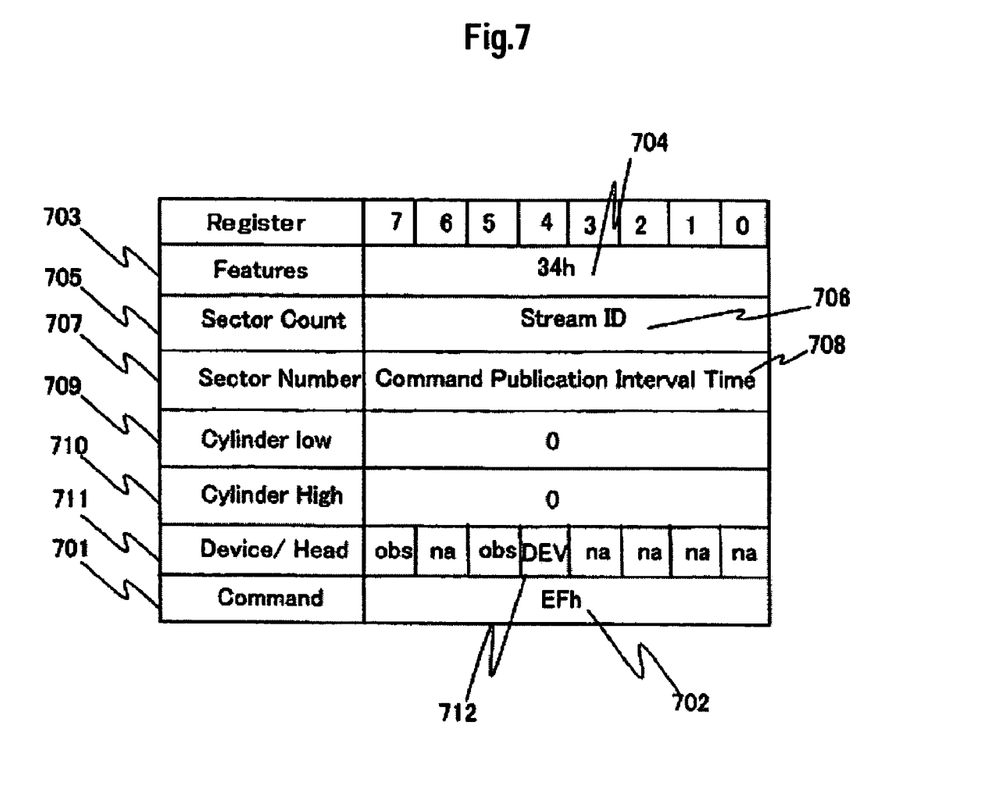
FIG. 7 is a diagram showing an example of a command for notifying the disk drive of the command publication interval.

FIG. 7 shows parameters in the Set Features command for notifying the command publication interval for each stream. EFh code 702 representing the Set Features command is written in Command register (701). Then, 34h (704) is set in Features register 703 as Sub Command code representing the command publication interval. Then, a stream ID (706) is set in Sector Count register (705). Then, a command publication interval time (708) for each stream is set in Sector Number register (707). As Cylinder Low (709) and Cylinder High (710) registers do not have to be set to a specific value, 0 is set in these registers. Then, a number of the selected device (a master device is numbered as 0 and a slave device is numbered as 1) is set in bit 4 (712) of Device/Head register 36 (711). Then, no value is set in bits 0 to 3 and 6 of the Device/Head register (711). Then, 0 is set in bit 5 and bit 7 of the Device/Head register (711).

Figure 8:
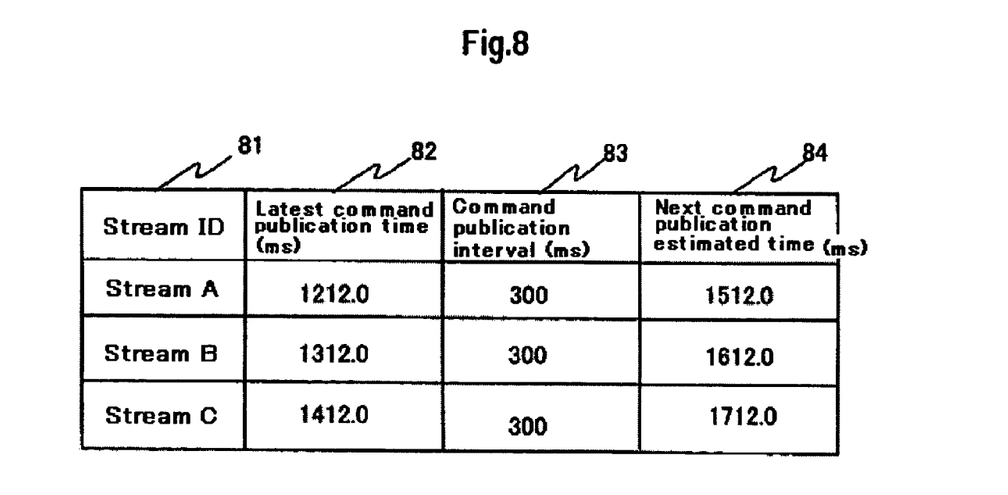
FIG. 8 is a diagram showing an exemplary configuration of a table for managing the command publication interval, a latest command publication time, and a next command publication estimated time according to an embodiment of the present invention.

FIG. 8 shows an exemplary configuration of a command publication time management table for managing data for calculating a time that the disk drive can allocate for the PC data processing command. This table includes entries such as: a stream ID (81); a latest command publication time (ms) (82); a command publication interval (ms) (83); and a next command publication estimated time (ms) (84). In the latest command publication time (82) entry, a publication time of the latest command for each stream is registered. Then, in the command publication interval (83) entry, a command publication interval (ms) set by the host for each stream is registered. Then, in the next command publication time (ms) (84) entry, a next command publication estimated time that is calculated by adding the command publication interval to the latest command publication time for each stream is registered.

Figure 9:
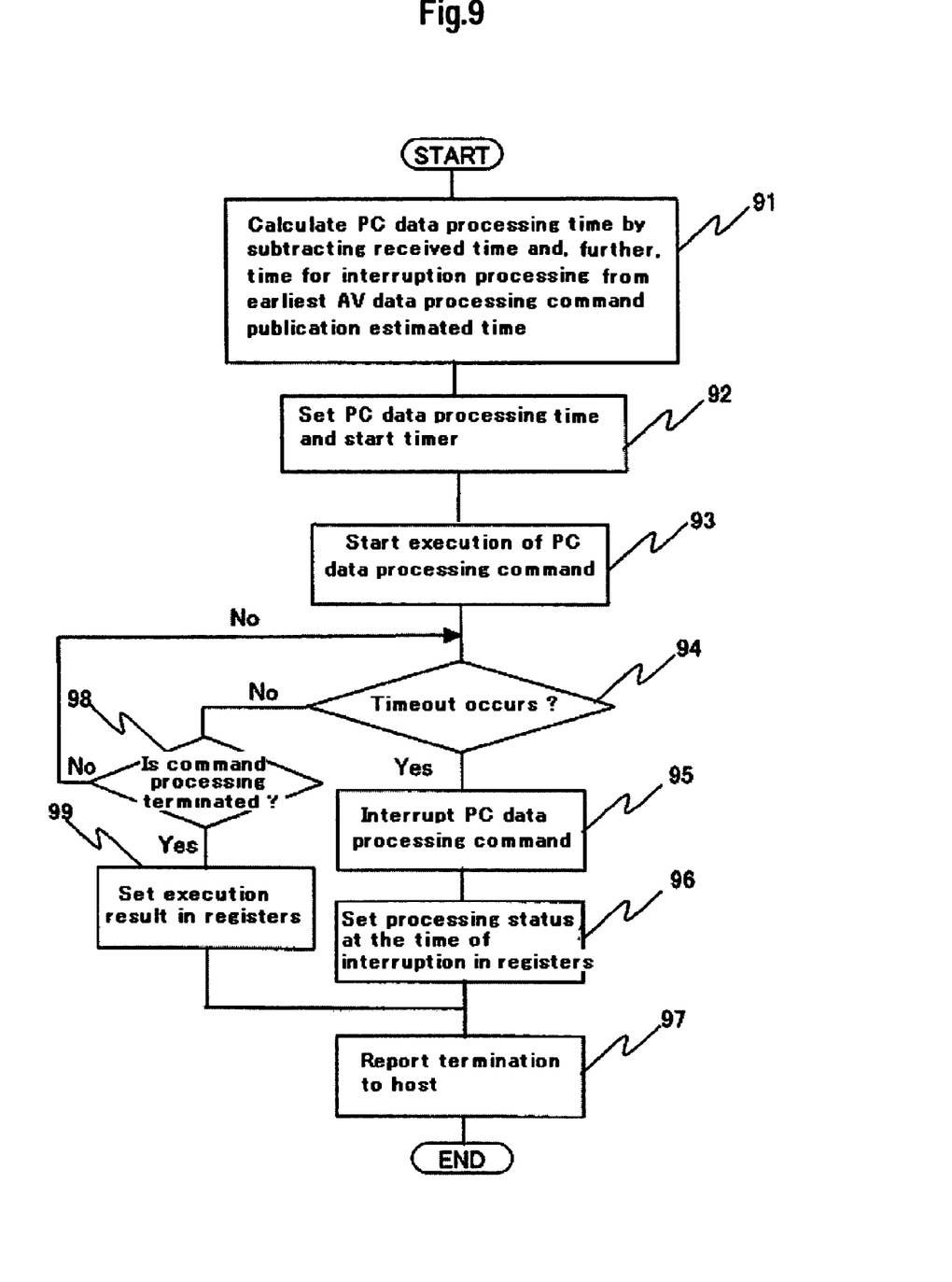
FIG. 9 is a diagram showing a process flow for performing the PC data processing by using the time that can be allocated for the PC data processing, which is calculated based on the command publication estimated time according to an embodiment of the present invention.

FIG. 9 shows a process flow for calculating the time that can be allocated for the PC data processing based on the command publication time management table described above. Upon receipt of the PC data processing command, a data processing time that can be allocated for the received command is calculated by subtracting the publication time of such command and, further, the time taken for interruption processing from the earliest command publication estimated time (step 91). Next, such time is set in the timer 103 and the time 103 is started (step 92). The Execution of the PC data processing command is started (step 93).

The timeout is checked (step 94) and, if the timeout is detected during the PC data processing, the PC data processing command is interrupted (step 95). Then the processing status at the time of the interruption is set in the registers of the HDC 106 (step 96). Then, the HDC 106 reports to the host that the command is terminated (step 97).

On the other hand, when the timeout is checked (step 94), if the timeout is not detected but the termination of the PC data processing command is detected (step 98), the execution result is set in the registers of the HDC 106 (step 99) and the host is reported that the command is terminated (step 97).

Further, when the timeout is checked (step 94), if the timeout is not detected and the termination of the PC data processing command cannot be detected, the process for detecting the timeout is performed again (step 94).

Alternatively, the command publication interval for each stream can be estimated by keeping a history of the command publication interval required for satisfying the data transfer requests by the host for each stream during the AV data processing. The next command publication time for each stream can be estimated based on the estimated command publication interval so that the time that can be allocated for the PC data processing can be calculated.

Figure 10:
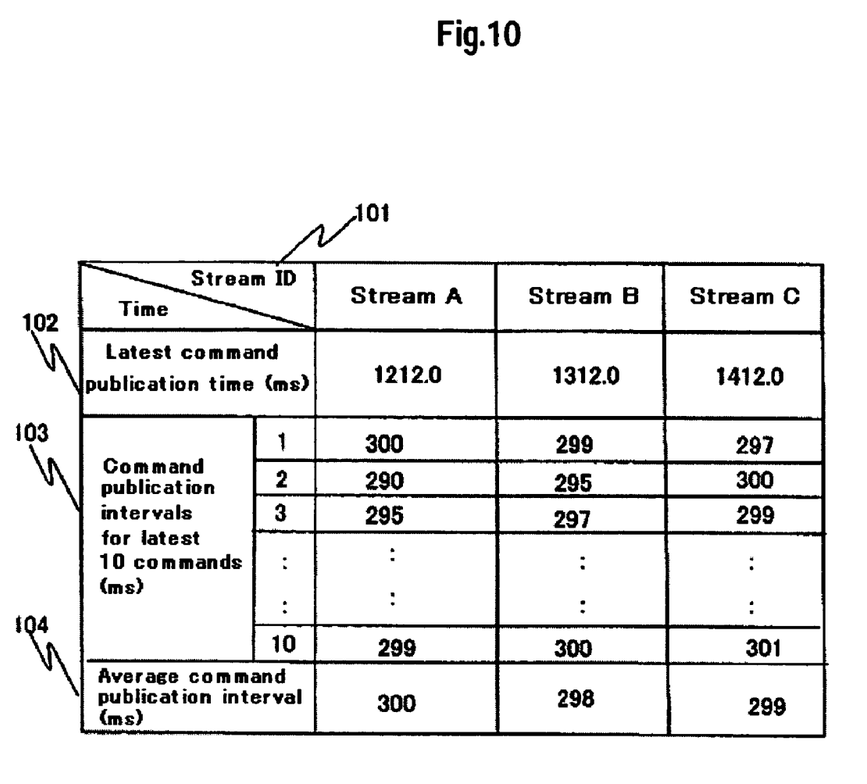
FIG. 10 is a diagram showing an example of a command publication interval management table.

FIG. 10 shows an example of a command publication interval management table for managing a history of a command publication interval for each stream. This table includes entries such as: a stream ID (101); a latest command publication time (ms) (102); command publication intervals for the latest 10 commands (ms) (103); and an average command publication interval (ms) (104). In the latest command publication time (102) entry, a publication time of the latest command for each stream is registered. In the command publication intervals for the latest 10 commands (ms) (103) entry, the command publication intervals for the latest 10 commands for each stream are registered. In the average command publication interval (ms) (104) entry, an average value of the latest 10 commands at the maximum for each stream is registered.

When the command publication interval management table shown in FIG. 10 is used, the method for calculating the execution time of the PC data processing command and the method for executing the PC data processing command are same as the process flow shown in FIG. 9.

Figure 11:
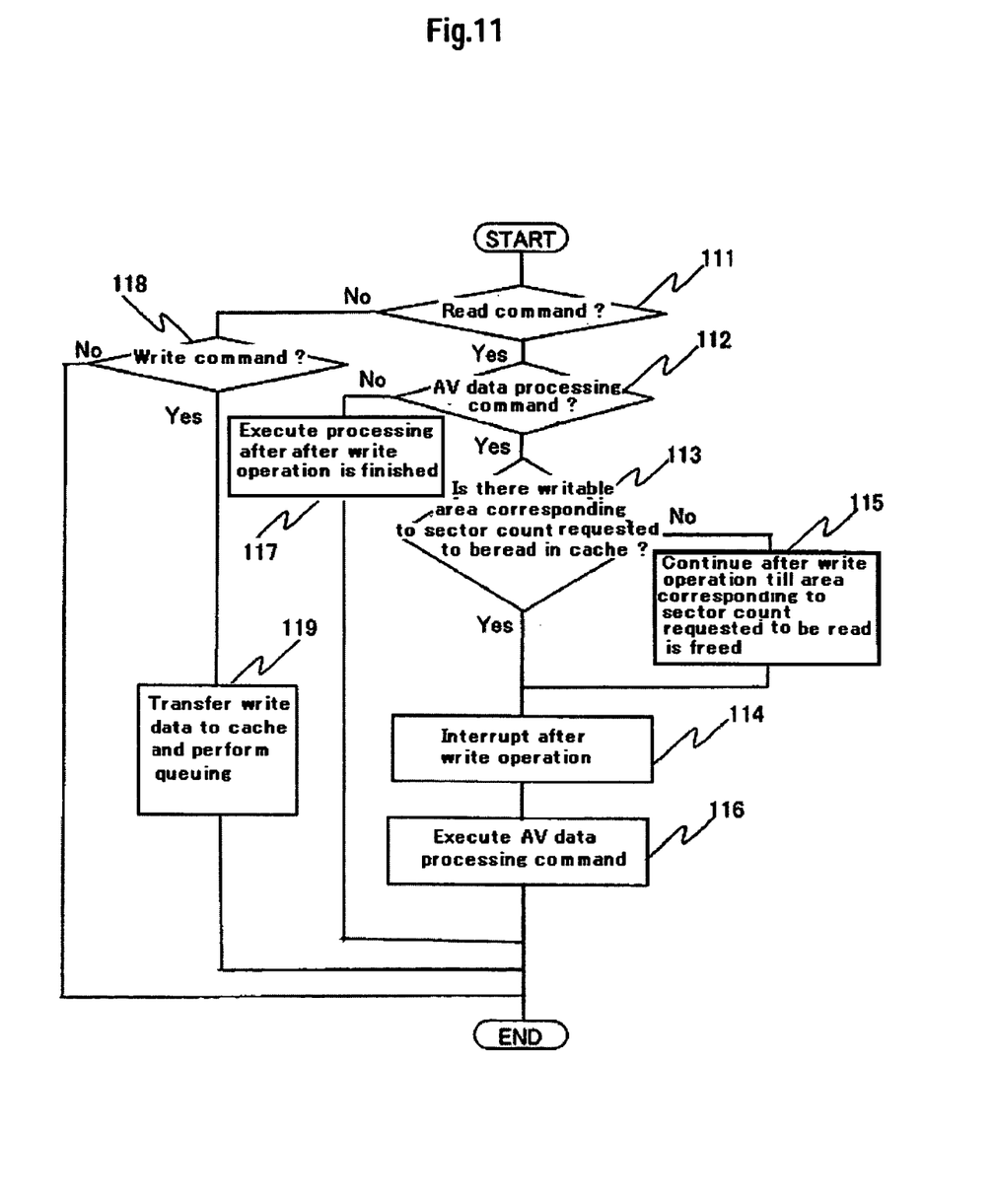
FIG. 11 is a diagram showing a control flow when an AV data processing command is received during an after write operation according to an embodiment of the present invention.

FIG. 11 shows a control flow in which an AV data processing command can be executed with priority by interrupting an after write operation when the AV data processing command is received during the after write operation and there is a cache miss for such command.

When the disk drive of the present embodiment receives a command during an after write operation, it checks whether the received command is a read command (step 111). If it is the read command, it is checked whether it is an AV data processing command (step 112). If it is the AV data processing command, it is checked whether there is a writable area corresponding to the sector count requested by the received read command in the cache (step 113). If there is the writable area corresponding to the sector count requested by the received read command in the cache 105, the after write operation is interrupted (step 114). On the other hand, if there is not the writable area corresponding to the sector count requested by the received read command in the cache 105, the after write operation is continued till the area corresponding to the sector count requested to be read is freed (step 115). After that, the after write operation is interrupted (step 114). Next, the received AV data processing command is executed (step 116).

Further, if the received command is a read command and a PC data processing command, the process is executed after the after write operation that is being performed is finished (step 117). On the other hand, if the received command is a write command (step 118), the write data is transferred to the cache 105 and, then, queuing is performed (step 119). Further, if the received command is not a read command (step 111) and it is not a write command (step 118), the process is terminated.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk drive comprising:
   a disk on which data for a realtime processing is recorded;
   a timer for managing times;
   a cache for temporarily storing data read from said disk and data transferred from a host; and
   a control section having registers that are accessible from the host and controlling data transfer between said cache and the host and between said cache and said disk;
   wherein, when said control section receives a non-realtime processing command after a realtime processing command from the host, said control section sets a time limit of execution of said non-realtime processing command in said timer and starts the execution and, if the execution of said non-realtime processing command is not completed within said time limit, interrupts the execution of said non-realtime processing command forcibly and, then, sets a data transfer status to the host at the time of the interruption in said registers and reports to the host that said non-realtime processing command is terminated.

2. The disk drive according to claim 1, wherein, when said non-realtime processing command is interrupted, even after said control section reports to the host that said non-realtime processing command is terminated, said control section continues data transfer to said cache based on said non-realtime processing command, which is interrupted to transfer data to the host, till the next realtime processing command is received from the host and a cache miss of said realtime processing command is found.

3. The disk drive according to claim 1, wherein said control section calculates a time limit by referencing information about an allocatable time set in said non-realtime processing command and sets the calculated time limit in said timer.

4. The disk drive according to claim 1, further comprising a command publication time management table for storing information about a publication interval of the realtime processing command obtained from the host, information about the latest publication time of said realtime processing command, and information about an estimated publication time of the next realtime processing command that is estimated based on said latest publication time and said publication interval.

5. The disk drive according to claim 4, wherein said command publication time management table stores said information about the publication interval, said information about the latest publication time, and said information about the estimated publication time for a plurality of streams.

6. The disk drive according to claim 1, further comprising a command publication interval management table for storing history information of a publication interval of the received realtime processing command, information about an average command publication interval calculated from said history information, and information about the latest publication time of said realtime processing command.

7. The disk drive according to claim 6, wherein said command publication interval management table stores said history information of the publication interval, said information about the average command publication interval, and said information about the latest publication time for a plurality of streams.

8. A disk drive comprising:
a disk on which data for a realtime processing is recorded;
a cache for temporarily storing data read from said disk and data transferred from a host; and
a control section configured to control data transfer between said cache and the host and between said cache and said disk;
wherein, when a realtime processing command is received during an after write operation and there is a cache miss for said realtime processing command, said control section executes said realtime processing command with priority by interrupting said after write operation.

9. A method for performing a realtime processing and a non-realtime processing simultaneously by a disk drive comprising a disk on which data for a realtime processing is recorded; a timer for managing times; a cache for temporarily storing data read from said disk and data transferred from a host; and a control section having registers that are accessible from the host and controlling data transfer between said cache and the host and between said cache and said disk; said method comprising:
receiving a non-realtime processing command;
setting a time limit of execution of the received non-realtime processing command in said timer and starting the process; and
if the execution of said non-realtime processing command is not completed within said time limit, interrupting the execution of said non-realtime processing command forcibly, setting a data transfer status to the host at the time of the interruption in said registers and reporting to the host that said non-realtime processing command is terminated.

10. The method for performing a realtime processing and a non-realtime processing simultaneously according to claim 9, further comprising:
reporting to the host that said non-realtime processing command is terminated, and receiving the next realtime processing command from the host; and
continuing data transfer to said cache based on said non-realtime processing command, which is interrupted to transfer data to the host, till a cache miss of said realtime processing command is found.

11. The method for performing a realtime processing and a non-realtime processing simultaneously according to claim 9, further comprising:
calculating a time limit by referencing information about an allocatable time set in said non-realtime processing command; and
setting the calculated time limit in said timer.

12. The method for performing a realtime processing and a non-realtime processing simultaneously according to claim 9, further comprising:
obtaining information about a publication interval of the realtime processing command from the host;
estimating the next publication time of said realtime processing command from the latest publication time of said realtime processing command and said information about the publication interval;
receiving a non-realtime processing command; and
calculating a time limit of the execution of said non-realtime processing command from the receipt time of said non-realtime processing command and the estimated next publication time of said realtime processing command.

13. The method for performing a realtime processing and a non-realtime processing simultaneously according to claim 12, wherein each of said steps is performed for a plurality of streams.

14. The method for performing a realtime processing and a non-realtime processing simultaneously according to claim 9, further comprising:
keeping a history of the publication interval of the received realtime processing command;
calculating an average command publication interval of said realtime processing command from said history of the publication interval;
estimating the next publication time of said realtime processing command from the latest publication time of said realtime processing command and said average command publication interval;
receiving the non-realtime processing command; and
calculating the time limit of the execution of said non-realtime processing command from the receipt time of said non-realtime processing command and the estimated next publication time of said realtime processing command.

15. The method for performing a realtime processing and a non-realtime processing simultaneously according to claim 14, wherein each of said steps is performed for a plurality of streams.

* * * * *